June 23, 1936.  S. J. ROSCH  2,045,104
REENFORCED SHEATHED CABLE
Filed May 23, 1934
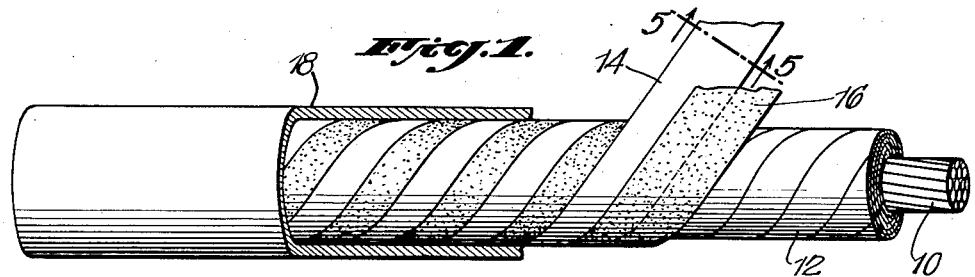
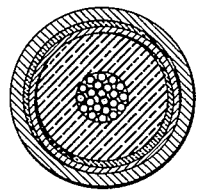
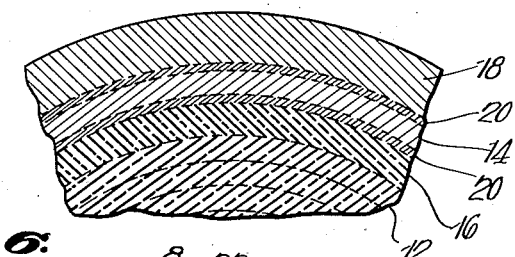
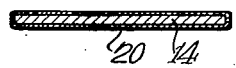
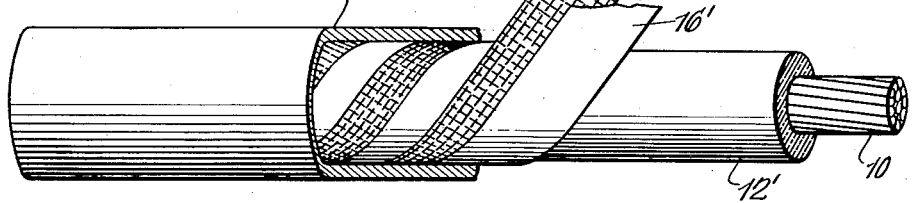
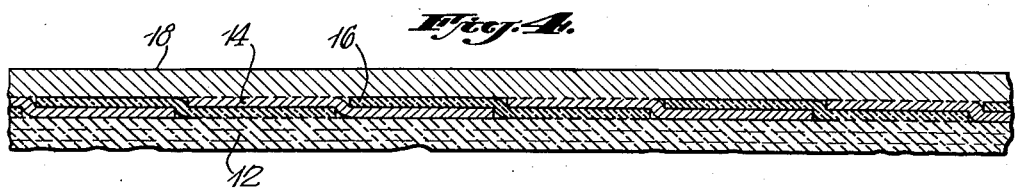
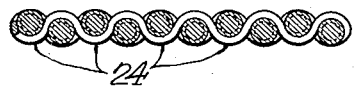
INVENTOR
SAMUEL J. ROSCH.
BY
ATTORNEYS Patented June 23, 1936

2,045,104

UNITED STATES PATENT OFFICE 2,045,104

REENFORCED SHEATHED CABLE

Samuel J. Rosch, Yonkers, N. Y., assignor to Anaconda Wire & Cable Company, New York, N. Y., a corporation of Delaware Application May 23, 1934, Serial No. 727,047

9 Claims. (Cl. 173—266)

This invention relates to cables of the type having an outer metallic sheath and with insulation surrounding the conductor which is impregnated with a liquid dielectric.

In high tension cables of the so-called solid type, the conductor has been wound with tapes of paper or similar material impregnated with an insulating compound such as oil, and the conductor with its insulating wrapping has then been enclosed in an outer sheath, usually of lead tubing formed about the insulating wrappings.

During the daily load cycle or cycles, the cable constituents are alternately heated to high temperatures as a result of the power transmitted through the cable and are permitted to cool to lower temperatures when the load is removed; these cycles being known as heating and cooling cycles.

During the heating part of the cycle, the oil or other impregnating fluid in the wrappings expands against the lead sheath at a rate which is approximately six to eight times as great as the expansion of the sheath itself. Consequently, either the lead sheath is forced beyond its normal expansion for a particular temperature, or the oil builds up a high internal pressure.

During the cooling period of the cycle, the oil contracts to its original volume, but the lead sheath, if it has been forced to expand beyond its normal rate of expansion, is unable to contract to its original volume or space. This results in the formation of voids within the interior of the insulating structure or between this structure and the lead sheath.

It is a recognized fact that these voids are harmful to the useful life of the cable and considerable effort has been expended in an attempt to limit their formation. One of these methods is to restrain the lead sheath from expanding away from the cable core and this has usually been accomplished by means of armoring devices applied over the lead sheath. This not only produces a more expensive cable due to the addition of the external coverings and the operations necessary to apply them, but the increase in overall diameter of such cables due to the application of these outer coverings, may prevent their being pulled in to existing duct installations which ordinarily would be adequate for the lead covered cables without these restraining coverings.

One object of my invention is to provide interior means for preventing the expansion of a lead sheath. A further object is to provide a separately formed member adapted to be intimately secured or bonded to the lead sheath, simultaneously with the application or formation of the sheath about the cable.

The above and further objects of the invention will be fully apparent from the following detailed disclosure when read in connection with the accompanying drawing and the invention will be defined with particularity as required by the patent statutes in the appended claims.

In the drawing—

Fig. 1 is an elevation of a cable embodying my invention with parts broken away and shown in section to reveal the interior structure; Fig. 2 is a transverse section through the cable of Fig. 1; Fig. 3 is an enlarged fragmentary section; Fig. 4 is an enlarged longitudinal section through the cable sheath and showing the reenforcing member bonded thereto and secured to the cable insulation; Fig. 5 is a detail cross section of a reenforcing strip having a coating or skin of a metal adapted to facilitate the bonding of the reinforcing strip to the inner surface of the lead sheath; Fig. 6 is a cross section of a reenforcing strip of modified form, wherein the skin to facilitate bonding covers only a fractional part of the strip. Fig. 7 is a view similar to Fig. 1 illustrating a modification.

In Fig. 1, 10 represents a metallic conductor which in the case illustrated is formed of a multiplicity of strands, it being understood, however, that a solid conductor may also be used. Over the conductor 10, there is a body of insulating material 12 which in the case illustrated comprises wrappings of paper, or equivalent insulating material commonly used in the art such as cambric or the like. The insulating material 12 is impregnated with any one of the various liquid compounds known to the industry.

Over the body of insulation 12, I apply an improved wrapping consisting of a metallic reenforcing strip 14 having a paper strip 16 overlapping or intercalated therewith. As will be clear from the drawing, the relationship of the metal strip 14 and the paper strip 16 is such that a portion of each convolution of the metal strip is exposed on the exterior and on the interior and another portion on the exterior and interior is covered by the paper strip. The metal strip 14 is preferably provided with a skin or coating of a readily fusible metal to facilitate the bonding of the strip 14 with the outer lead sheath 18. In Fig. 5, the skin is indicated at 20 and covers both the inner and outer faces of the strip 14. Alternatively, as shown in Fig. 6, the skin 20' may cover only a portion of each side thereof. In some cases, only one face of the strip may be covered with a readily fusible metallic skin. The strip 14 is preferably of a metal having a higher tensile strength than that of the outer sheath and the skin is of a metal having a lower fusing point than that of the strip. For example, the strip 14 may be of copper and the skin 20 may be of tin. Such tin coated strip can be readily bonded or practically homogeneously united to the interior surface of the lead sheath

18 during the application of the sheath to the cable. During such application of the lead sheath, the heated lead forms an amalgam with the exposed tinned surface of the reenforcing tape, thus causing such exposed portion to become bonded securely to the outer sheath. The presence of an intercalated paper, cloth, or even an untinned, thin flexible metal strip 16 is desirable for the purpose of preventing the bonding together of the overlapped convolutions of the metal reenforcing strip 14 so as to maintain the flexibility of the cable.

I preferably form the cable in such manner that approximately only one half of the area of each convolution of the reenforcing strip 14 will be secured to the sheath while the other half is secured to the insulated wrappings. This is deemed important because it is effective to prevent the outer sheath from expanding away from the wrappings of the inner body of insulation 12 during the heating portion of the load cycles hereinabove discussed.

In the modification shown in Fig. 7, instead of employing a solid metallic strip as a reenforcement, I provide a strip of fabric having a plurality of metallic wires 22 interwoven with other textile strands. These wires are preferably tinned or provided with a coating of readily fusible metal so that as the lead sheath 18' is applied, the exposed peaks 24 of the wire will become bonded or secured to the inner surface of the sheath. In this form of the invention, I will also employ a strip 16' of paper or the like intercalated with the reenforcement strip as clearly shown. In this form of the invention, the body of insulation 12' may be regarded as any suitable type of oil impregnated dielectric covering the conductor 10.

The reenforcing metallic tape 14 may be of any suitable metal having the requisite tensile strength so long as it has a coating of skin which facilitates the bonding of it to the outer relatively weaker sheath of lead or other similar inelastic substantially impermeable metal. While tin is peculiarly well suited for the skin or coating for the reenforcing sheet, I contemplate using other readily fusible metals or alloys. For example, the reenforcing strip may be covered with conventional types of solder or I may employ special types of solders and also material such as zinc or the like.

The strips 14 and 16 may also be used as the binder or shielding tape of any of the so-called shielded cables having the usual type of insulation such as rubber or varnished cloth, or the like without in any way detracting from the underlying principles of my invention. And such strips 14 and 16 may be used as a covering interposed under the lead sheath over belted insulation of a multi-conductor cable.

While I have described quite specifically the embodiments of the invention herein illustrated, it is to be understood that various modifications may be made without departing from the invention as defined in the appended claims.

What I claim is:—

1. A conductor enclosed in a body of insulation impregnated with liquid insulating material, an outer metallic sheath of a metal of relatively low tensile strength, and a strip of metal wrapped around said body of insulation, said strip having a tensile strength relatively higher than said sheath and being bonded to the inner surface of said sheath.

2. A conductor enclosed in a body of insulation impregnated with liquid insulating material, an outer metallic sheath of metal of relatively low tensile strength, a helical ribbon-like strip of metal of relatively high tensile strength embracing said body of insulation, a limited portion of the length of each convolution of said strip being intimately bonded to the inner surface of said sheath.

3. A conductor enclosed in a body of insulation impregnated with liquid insulating material, an outer metallic sheath of metal of relatively low tensile strength, a helical strip of metal of relatively high tensile strength embracing said body of insulation, a limited portion of the length of each convolution of said strip being intimately bonded to the inner surface of said sheath and a non-metallic strip intercalated between the inner surface of the sheath and the portions of each convolution of the metal strip which is not bonded to the sheath.

4. A conductor enclosed in a body of insulation impregnated with liquid insulating material, an outer sheath of metal of relatively low tensile strength, a helical strip of metal of relatively higher tensile strength embracing the body of insulation and having a skin of readily fusible metal bonding said strip to said sheath.

5. A conductor enclosed in a body of insulating material, an outer sheath of metal of relatively low tensile strength, a helical strip of metal of relatively higher tensile strength embracing the body of insulation, said strip having at least a portion of each convolution coated with a readily fusible metal uniting the strip to the inner surface of the sheath.

6. A conductor enclosed in a body of insulation, an outer sheath, a helical strip of metal of higher tensile strength than said sheath embracing said body of insulation, a fraction of the length of each convolution of said metallic strip being bonded to the inner surface of the sheath and a non-metallic strip intercalated between the metallic strip and said sheath.

7. A conductor enclosed in a body of insulation impregnated with liquid insulating material, an outer lead sheath, a helical strip of metal of higher tensile strength, at least a portion of each convolution of said strip carrying a coating of readily fusible metal uniting the strip to the inner surface of the sheath, and a non-metallic strip intercalated with said metallic strip.

8. A conductor enclosed in a body of insulation, an outer lead sheath, a helical strip wrapped around the body of insulation, said strip being of a metal of higher strength than said sheath and having at least a portion of each convolution coated with tin and uniting such portion to the sheath and a strip of insulation intercalated between said metallic strip and the inner surface of said sheath.

9. An insulated conductor enclosed in a sheath of inelastic metal and having a helical reenforcing strip carrying by a substantially continuous body of readily fusible metal by means of which said strip is secured to the inner surface of the sheath and a strip of insulating material intercalated between said reenforcing strip and the inner surface of said sheath.

SAMUEL J. ROSCH.